Feb. 23, 1937. R. T. HAZELTON 2,071,402
BACK GAUGE FOR SHEARS
Filed May 4, 1933 5 Sheets-Sheet 5
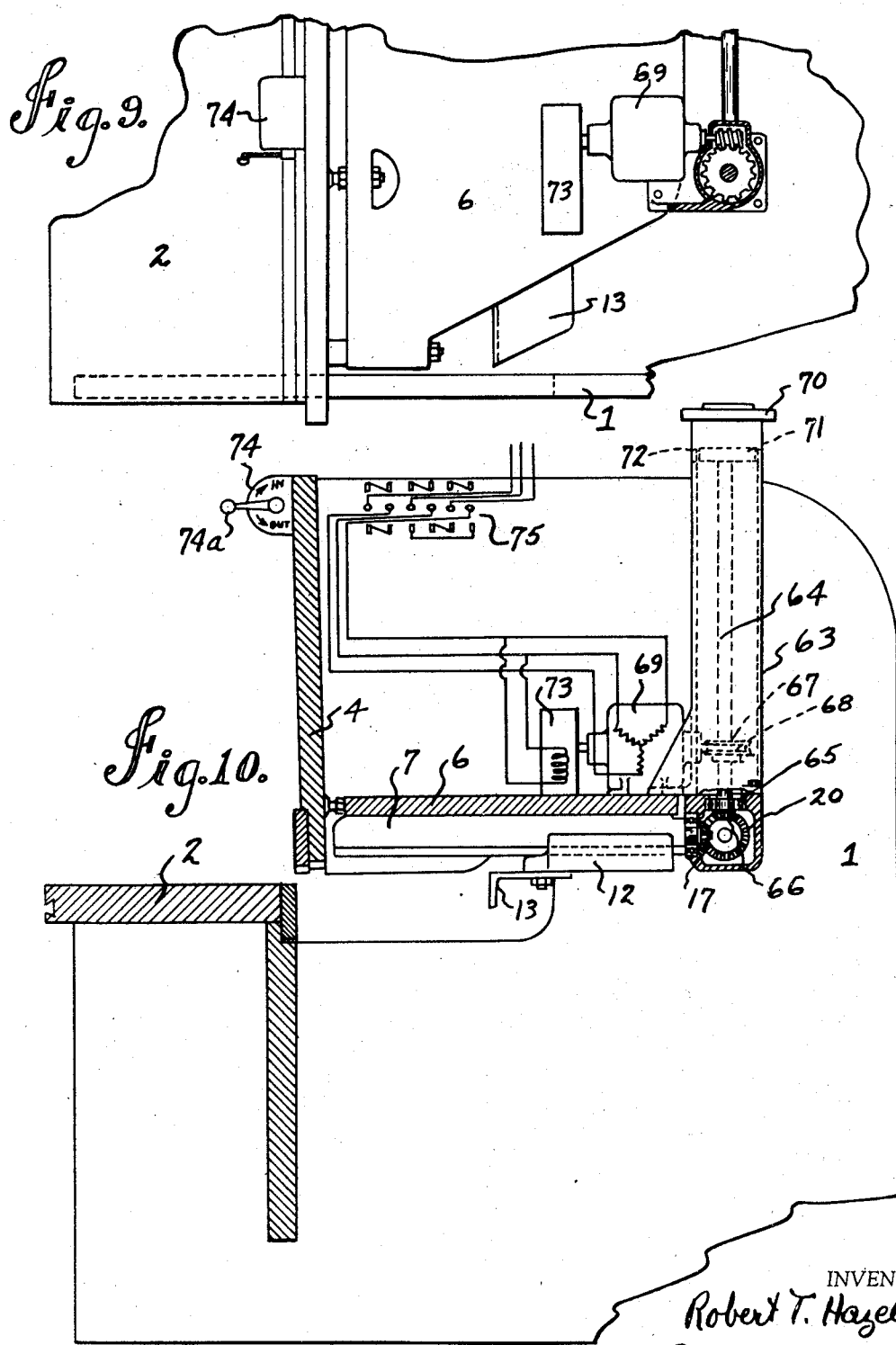
INVENTOR,
Robert T. Hazelton
BY Allen & Allen
ATTORNEYS.

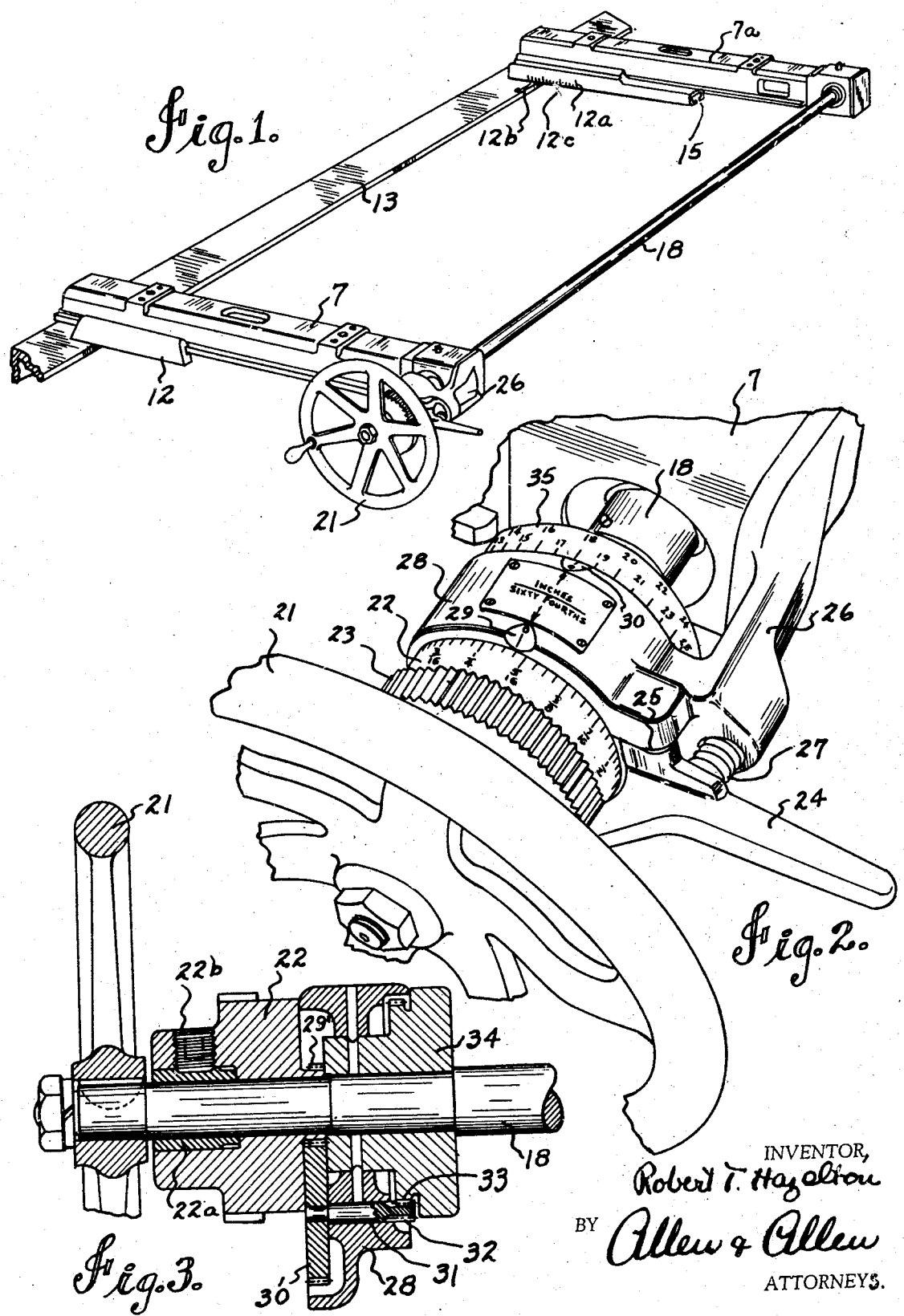

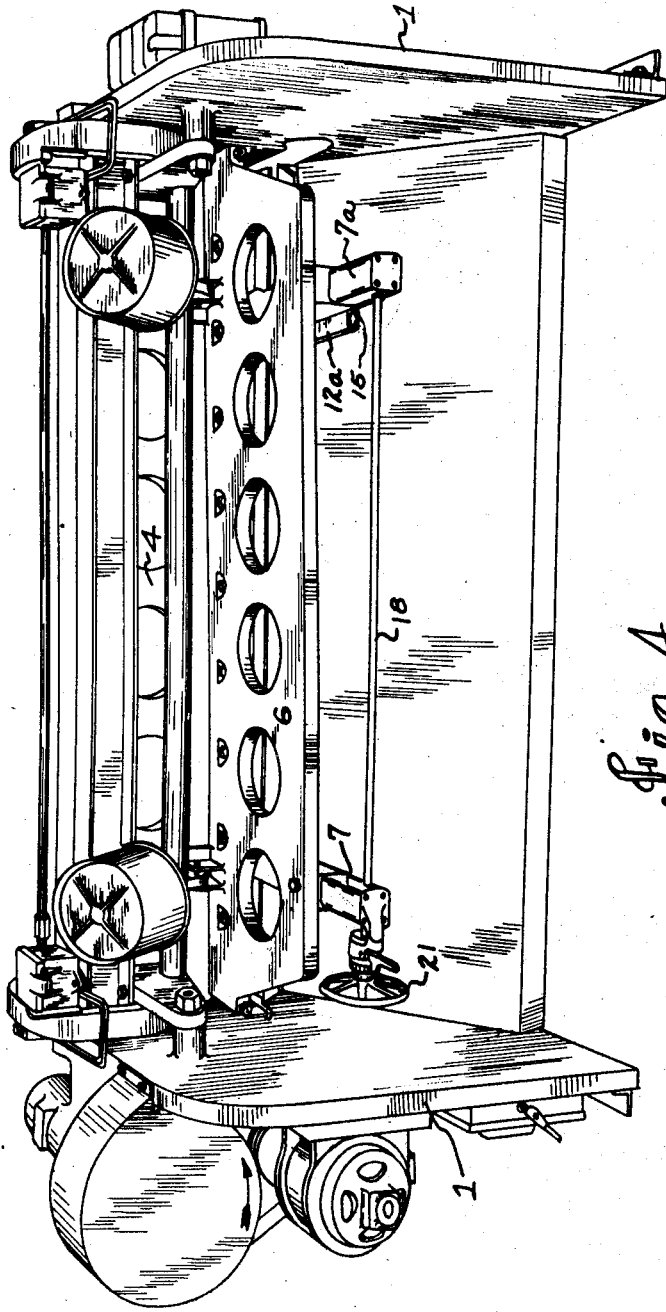
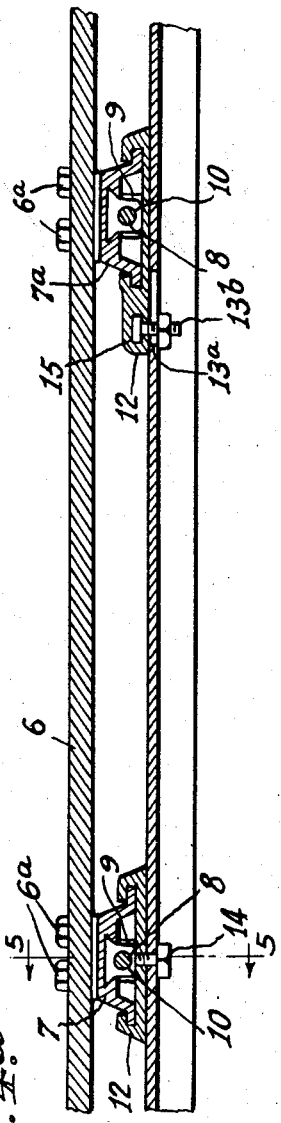
INVENTOR,
Robert T. Hazelton
BY Allen & Allen
ATTORNEYS.

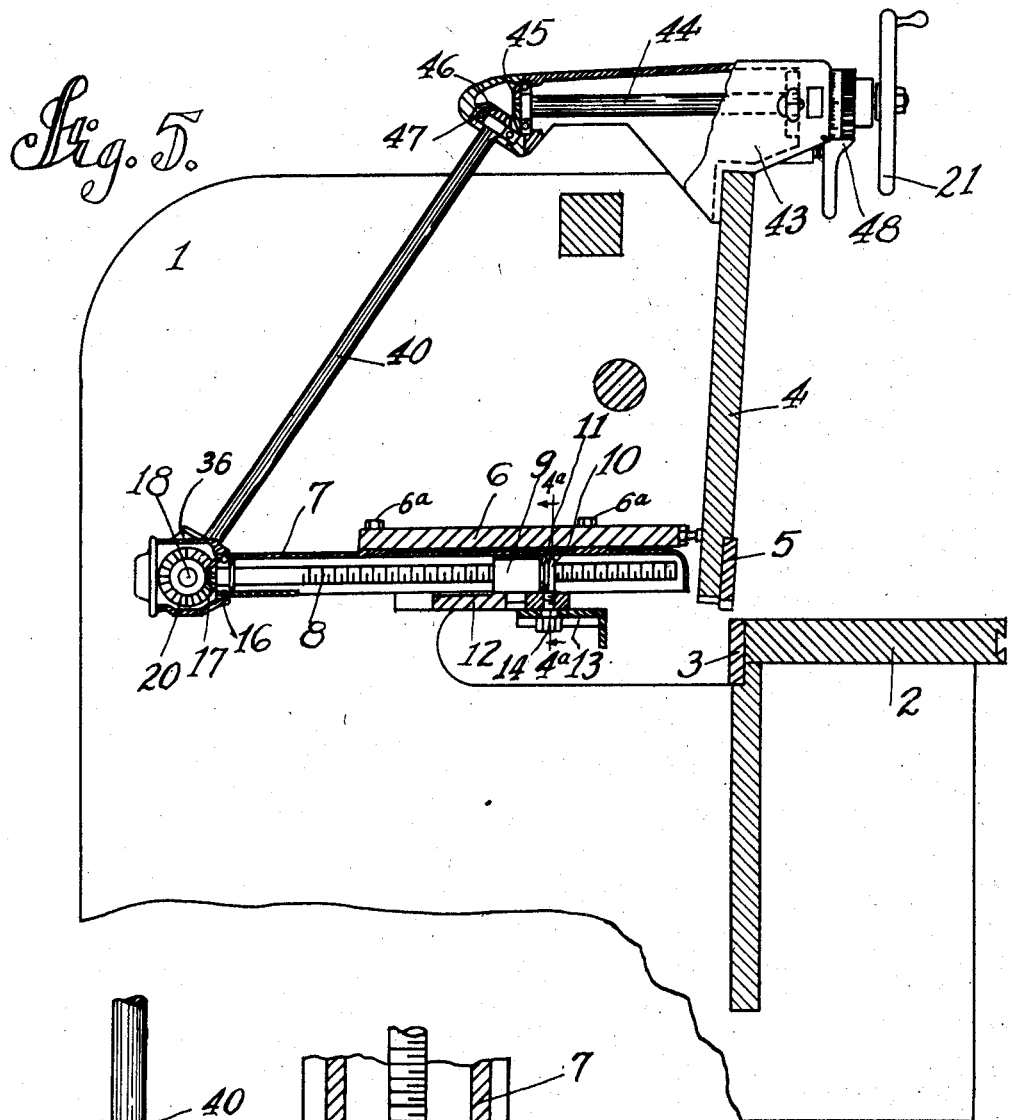
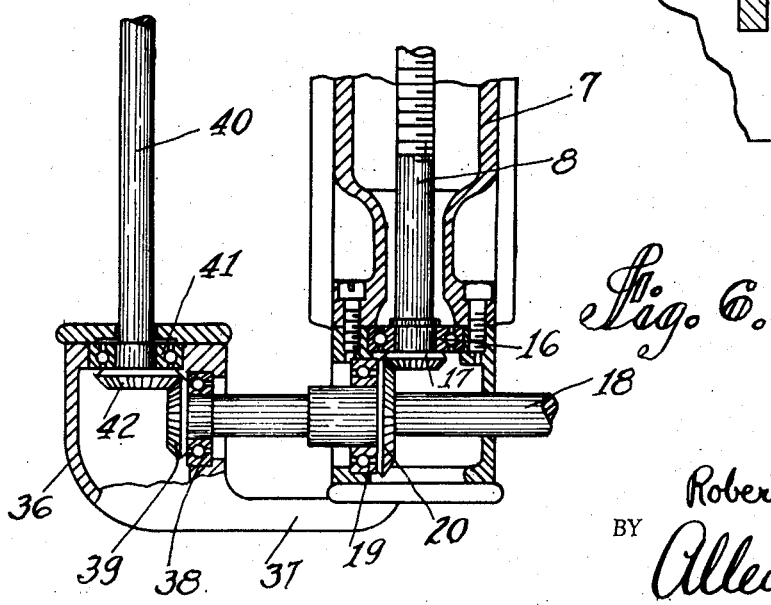

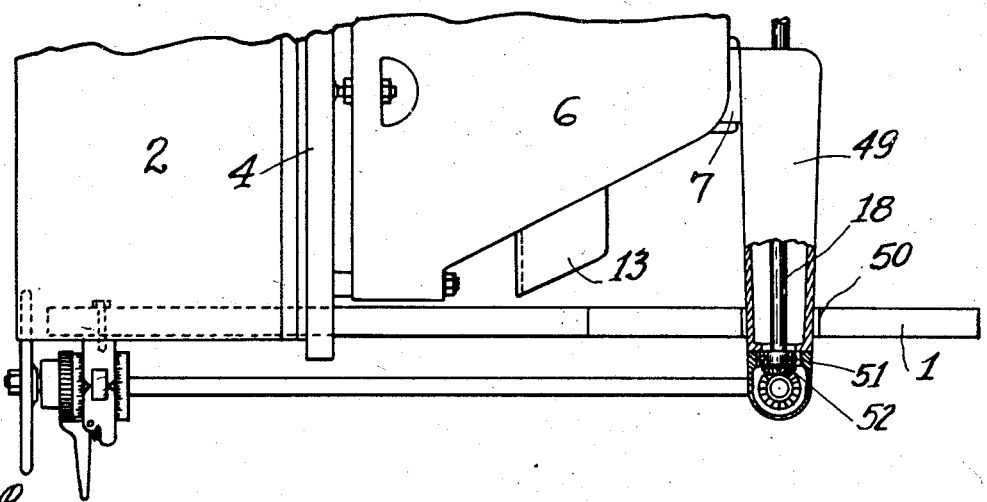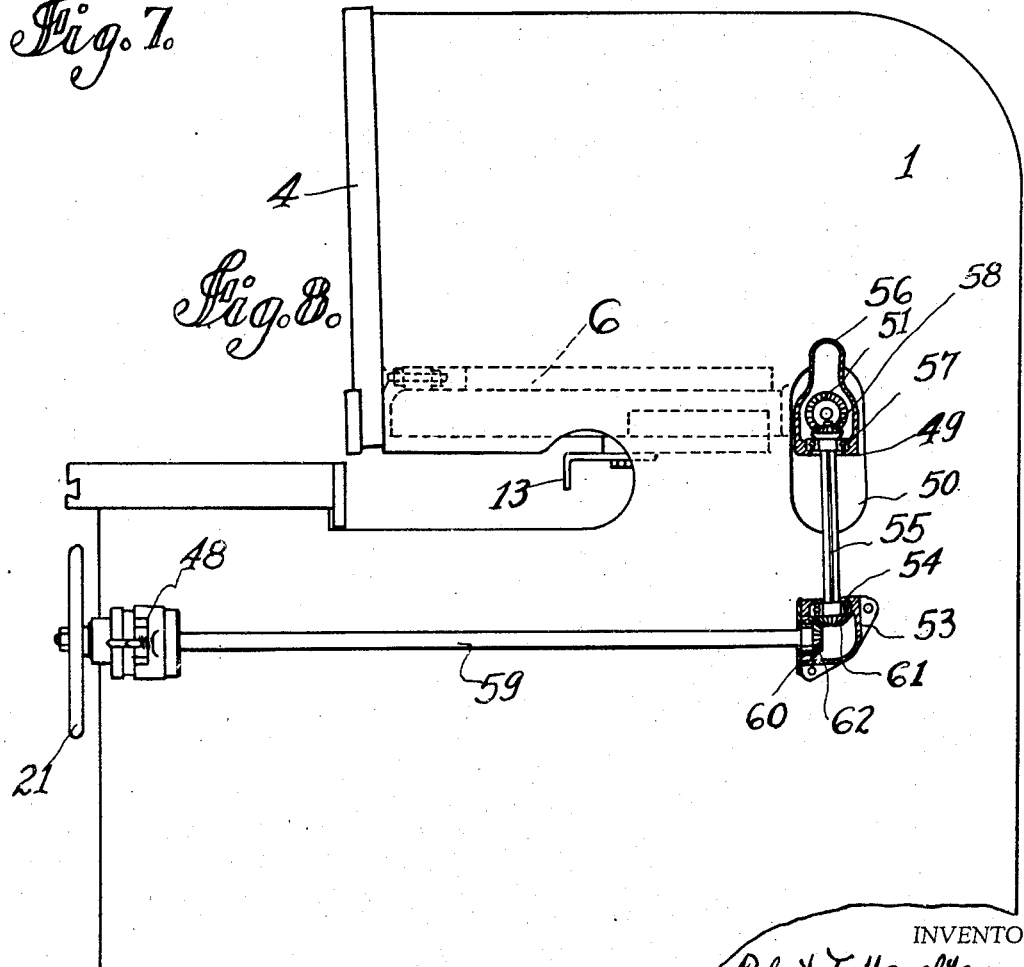

Patented Feb. 23, 1937

2,071,402

UNITED STATES PATENT OFFICE 2,071,402

BACK GAUGE FOR SHEARS

Robert T. Hazelton, Cincinnati, Ohio, assignor to The Cincinnati Shaper Company, Cincinnati, Ohio, a corporation of Ohio Application May 4, 1933, Serial No. 669,400

24 Claims. (Cl. 164—59)

My invention relates to back gauges for power shears, and particularly to the type of mechanism wherein a back gauge is fixed to the ram carrying the movable blade. Hitherto it has been the practice to provide a back gauge which is in the form of an abutment, together with means for moving this abutment to provide for different widths of cut. A way of doing this which has found favor in the art comprises the provision of threaded shafts at interspaced points in back of the ram, and lying generally perpendicular thereto, the abutment member, usually in the form of an angle piece, being attached to nuts riding on the threaded shafts. Means are provided for turning the shafts, which in one embodiment comprise a common shaft connected to the several threaded shafts by means of bevel gears, or the like, and provided with a hand wheel. A long scale and a pointer is usually provided to indicate the width of the cut. All of this mechanism is located behind the ram, where it is somewhat difficult to get at, and where, as one operates the hand wheel, or the like, it is somewhat inconvenient to read the scale at the same time. Moreover, since angular cuts are sometimes desired, and since it is therefore advantageous to be able to set the abutment member at various angularities with respect to the shear knives, provision has had to be made for this, usually by providing a slip clutch in the operating shaft which turns the various threaded shafts.

It is an object of my invention to simplify the construction of back gauge mechanisms. It is also an object of my invention to provide a novel indicating device for showing the width of the cut, which indicating device is located in such a position that it may be conveniently consulted by the operator as he works the mechanism which varies the width of the cut. It is again an object of my invention to provide a device which has improved provision for the setting of the back gauge at an angle, and which does not require the use of slip clutch mechanisms and the like. Further objects of my invention have to do with the provision in certain embodiments of a back gauge which can both be operated, and on which the width of cut may be read, from the front of the shear, so that it is not necessary for the operator to go back behind the shear to perform these operations. Clearly by such provision I attain another object of my invention, namely the provision of a shear structure, in which the operation can be speeded up.

These and other objects of my invention which will be set forth hereinafter or will be apparent to one skilled in the art upon reading these specifications, I accomplish by that certain construction and arrangement of parts of which I shall now describe certain exemplary embodiments. For a better understanding of my invention reference is now made to the drawings, wherein:

Figure 1 is a perspective view of an assembly of one form of my back gauge mechanism.

Fig. 2 is a perspective view of a hand wheel and indicating mechanism construction.

Fig. 3 is a sectional view of the device of Fig. 2 showing the several operating parts thereof.

Fig. 4 is a view in perspective of the rear of a power shear showing the type of back gauge and indicating mechanism of Fig. 1 in place thereon.

Fig. 4a is a transverse vertical section on line 4a—4a of Fig. 5.

Fig. 5 is a view showing one way of bringing out the back gauge operating and indicating mechanism to the front of the shear, also showing the abutment connections in vertical section on the line 5—5 of Fig. 4a.

Fig. 6 shows in section a portion of the operating parts for the device of Fig. 5, the left hand part being conventionally indicated as in the plane of the right hand part, for clearness.

Figs. 7 and 8 are respectively plan and elevational views of another way of bringing out to the front of the shear the operating and indicating mechanism for the back gauge.

Figs. 9 and 10 are respectively plan and elevational views of a motor-driven back gauge mechanism, Fig. 10 having parts in section and showing also a wiring diagram.

Briefly, in the practice of my invention, I provide means for mounting a pair of threaded shafts in a position substantially perpendicular to the ram, an abutment, means to which the abutment is attached, which means are threaded upon the shafts, a common means for operating the threaded shafts, a novel indicator mechanism attached thereto, and means for providing for angle cuts, which means comprise a member slidable and adjustable with reference to one of the means threaded on the shafts, to which means the abutment is also pivoted. In other phases of my invention I provide mechanical means for locating the operating device and indicating means for the back gauge at the front of the shear, or a motor drive for the back gauge mechanism, and indicating means which are readable from the front of the shear.

I have shown a shear having a frame 1, a table 2, a lower knife 3, and a ram 4 bearing an upper knife 5. A back stay for the ram is indicated at 6, and on the bottom of this back stay are mounted, by bolts 6a, housing members 7 and 7a, containing respective threaded shafts 8. As seen in Figs. 4a and 5, a main nut member 9 is threaded upon each shaft 8, and slidable but non-rotatable with respect to the housing 7 or 7a. A supplementary nut member 10 is also provided, which similarly is slidable but non-rotatable with respect to the housing 7 or 7a, and a compression spring 11 is located between the main nut 9 and the supplementary nut 10. The purpose of this construction is to take up any play between the nuts and the threads, to provide for the smooth operation of the device, and to eliminate lost motion and inaccuracies. A member 12 is slidably mounted with respect to the housing 7 and is connected with the main nut 9. The abutment member 13 is in the form of an angle iron, and is pivoted as at 14 to the slide 12.

The right hand sliding member 12a differs from the member 12 in that it is wider, and is provided with a longitudinal T-slot 15. The abutment member 13 has a longitudinal slot 13a at this side, through which is a bolt 13b slidable in the T-slot 15. Thus the abutment member 13 may be held to the member 12a in a plurality of positions, by the bolt 13b slidable in the T-slot 15 and also slidable along the member 12a in the slot 13a of the abutment member 13. This makes provision for adjusting the angularity of the abutment member 13 without the necessity of any unequal or differential movement of the threaded shafts. The operator, in providing for an angle cut, will first set the abutment 13 to the desired angularity by loosening its connection with the member 12a, sliding it with respect thereto, and tightening it in the new position. After the abutment member 13 has been set to the desired angularity, the width of cut is gauged by a rotation of both shafts in unison by means of the hand wheel, as will hereinafter be explained. Cooperating indicia 12b and 12c may be placed on the abutment member 13 and the sliding member 12a to indicate the angular displacement of the abutment member.

A reference to Figs. 5 and 6 will show the threaded shaft 8 in its housing 7, provided with a bearing 16, and a bevel pinion 17. A horizontal shaft 18, common to both threaded shafts, is mounted in bearings 19 and is provided with a bevel gear 20 meshing with the bevel pinion 17. The common shaft 18 may be connected directly to a hand wheel and indicating mechanism such as I have shown in Figs. 1, 2 and 3. Here the hand wheel is indicated at 21, attached to the shaft 18. To the shaft is also attached a scale bearing member 22 provided in this instance with a serrated or toothed portion 23. 24 is a clamp member, pivoted as at 25, to a bracket member 26, and driven by a compression spring 27 in such a way that a tooth thereon meshes with the teeth of the serrated portion 23. The bracket 26 is attached to the end portion of the housing 7, and is provided with a central stationary portion 28, which not only holds index means 29 and 30, but also serves as a mounting for the gear arrangement next to be described.

Referring to Fig. 3, the hand wheel 21 will be understood as non-rotatably fixed to the shaft 18. So likewise is the member 22. This may, however, conveniently be done by providing the member 22 with a split bushing 22a and a set screw 22b, so that the position of the member 22 on the shaft 18 may be adjusted. In this way the member 22 can initially be given the proper setting, and subsequently be returned to zero if it comes out. This member 22 has concentric and unitary with it, on its inner face, a pinion 29' meshing with a gear 30' mounted upon the bracket portion 28. This gear has a shaft 31 toothed as at 32. The teeth thereof mesh with a gear 33 concentric and unitary with a member 34 rotatably mounted upon the shaft 18. Since the bracket member 28 is stationary, as the shaft 18 is turned by means of the hand wheel, the member 22 will rotate once for each turn of the shaft 18, but the member 34 will rotate a lesser number of times, depending upon the ratio of the gear driving structure just referred to. The member 34 is provided with a scale 35 shown in Fig. 2. The two scales 22 and 35 may be graduated in any way desired. In the particular embodiment shown, the threads on the shaft 8 and the ratio of bevel gears 20 and 17 are such that one rotation of the hand wheel 21 will move the abutment 13 one inch. This provides for a rapid movement of the back gauge. Consequently I graduate the scale 22 in fractional parts of an inch, sixty-fourths of an inch in the illustrations. I graduate the scale 35, in inches. The reading on the scale shown in Fig. 2 is eighteen and nineteen sixty-fourths inch. It will be obvious, however, that the two scales may be otherwise graduated in the English, metric, or other systems of measurement, as desired. But whatever system of graduation is employed, it will be seen that I have provided for the rapid and easy operation of the back gauge mechanism, and an indicating means which is located at the point of operation and is easily and quickly read. In operation, when a new setting is desired, the lever 24 is swung aside, and the hand wheel rotated either forwardly or backwardly to the proper setting as indicated upon the scales 22 and 35, and the lever 24 is released, whereupon by engagement with the teeth 23 on the member 22, it locks the operating mechanism at the new setting. It will be clear that instead of the lever 24, I may use such other latching or braking means as may be desired, or such means may be omitted altogether.

A reference to Fig. 4 will show the location of the type of gauge of Fig. 1 on the back of a power shear. As such, my new device provides a great improvement over devices heretofore used. However, it is still more convenient to locate the operating and indicating means for the back gauge at the front of the shear, and one means for doing this is indicated in Figs. 5 and 6. Reference to Fig. 6 will show the shaft 18 prolonged and carried into a housing member 36, which is attached by means of a bracket 37 to the end of the housing 7 at an angle to shaft 18 as in Fig. 5, instead of as conventionally shown in Fig. 6. A bearing 38 is provided for the shaft 18 in this housing, and a bevel gear 39 is non-rotatably fixed to the shaft 18. Another shaft 40, extending upwardly at said angle to the shaft 18, is also journaled as at 41 in the housing 36, and is provided with a bevel gear 42 meshing with the gear 39. In Fig. 5 I have shown attached to the top of the ram 4 a housing member indicated generally at 43, containing a shaft 44 mounted in suitable bearings. This shaft carries a bevel gear 45, meshing with a bevel gear 46 on the end of the shaft 40, which enters the housing 43 and is journaled therein as by means of a bearing 47. Since all of this apparatus is mounted on the ram 4 and moves therewith, this enables me to bring out the hand wheel 21 and the various indicating and clamping devices, understood to be as shown in Figs. 2 and 3 and being marked generally 48 in Fig. 5, to the front of the shear, where the operator can get at them conveniently without passing to the rear of the shear. The hand wheel and indicating devices in the organization of Fig. 5, of course move with the ram 4.

In Figs. 7 and 8, I have shown a means whereby the hand wheel and operating mechanism can be brought out to the front of the shear, rigidly located on the frame thereof, and below the table. In this embodiment, by reason of the movement of the ram, I have made provision for a sliding connection in the operating mechanism for the back gauge. As shown in Fig. 7, I attach to the end of the housing member 7 a housing 49, which extends through a perforation 50 in the side frame member 1 of the shear. The shaft 18 is brought through this housing, and is journaled therein as at 51, being provided with a bevel gear 52. Below the opening 50 in the housing I provide a bracket 53, in which I journal, as at 54, a splined shaft 55. This shaft enters the housing 49, which is extended upwardly as at 56 to provide for the movement of the housing 49 with reference to the shaft 55. This shaft is provided with the bearing 51 in the housing 49, and a bevel gear 58 is slidably, but non-rotatably mounted on the shaft 55. This construction permits the ram to descend, the bevel gear 58 and the housing 49 sliding with respect to the shaft 55. Thus I am able to mount an operating shaft 59 non-slidably on the frame 1. This shaft is journaled as at 60 in the bracket 53, and is provided at its outer end (in a position for convenient access) with the hand wheel 21, and the indicating and operating device 48. Motion is transferred between shafts 55 and 59 by means of meshing bevel gears 61 and 62 on the shafts respectively in the bracket member 53.

In the embodiment of Figs. 9 and 10 a motor drive is provided. A housing member 63, attached to the member 7, extends upwardly and is provided with a vertical or substantially vertical shaft 64 journaled as at 65, and provided with a bevel gear 66 meshing with the gear 20. A worm gear 67 is mounted on this shaft, and is arranged to be driven by a worm 68 on the shaft of a motor 69 mounted upon the back stay 6 of the ram. At the top of the housing 63 an indicating dial 70 is attached to the shaft 64 and corresponds to the dial 22 of the other embodiment of my invention hereinabove illustrated. The dial in this case is made large, since it is to be read by the operator of the shear over the top of the ram 4. A second dial 71 is rotatably mounted upon the shaft 64, and is driven by a gear arrangement similar to that illustrated in Fig. 3. The housing 63 is perforated as at 72 to permit the dial 71 to be read.

The motor 69 is provided with some sort of braking device to stop the motor abruptly when the power is off. I have indicated at 73 in Figs. 9 and 10 a brake suitable for the purpose, which is a spring driven brake with a magnetic releasing device. The motor is controlled as to its movements by a forward and reverse control box of ordinary type illustrated at 74 in the drawings. Circuit connections in the box are of the ordinary type, but are indicated diagrammatically at 75 in Fig. 10. The box 74 is provided with a hand lever 74a. By flipping this lever down, the motor will operate in such a way as to move the abutment 13 of the back gauge outwardly to provide for a wider cut. By flipping the lever up, the operator can cause the motor to move the abutment 13 of the back gauge inwardly to provide for a narrower cut. The position of the back gauge can be read by consulting the dials 70 and 71 over the top of the ram. It will be clear that modifications may be made in my invention without departing from the spirit thereof.

Having thus described my invention, what I claim as new and desire to secure by Letters Patent, is:

1. In a back gauge for metal shears, the combination of a pair of threaded shafts, means for rotating said shafts, an abutment member, nuts on said shafts, said abutment member being pivoted with relation to the nut on one of said shafts and slidably mounted with respect to the nut on the other of said shafts.

2. In a back gauge for metal shears, a pair of housing members, threaded shafts in said housing members, means for rotating said shafts in unison, members slidable with respect to said housing members and controlled by nuts on said shafts, an abutment member, said abutment member pivoted with respect to one of said sliding members and slidably mounted for adjustment with respect to the other of said sliding members.

3. In a back gauge for metal shears, a pair of housing members, threaded shafts in said housing members, means for rotating said shafts in unison, members slidable with respect to said housing members and controlled by nuts on said shafts, an abutment member movable with the movable ram of said shears, said abutment member pivoted with respect to one of said sliding members and slidably mounted for adjustment with respect to the other of said sliding members by means comprising a member sliding with respect to an under-cut slot in said last mentioned sliding means.

4. In a back gauge for metal shears, a pair of housing members, threaded shafts in said housing members, means for rotating said shafts in unison, members slidable with respect to said housing members and controlled by nuts on said shafts, an abutment member, said abutment member pivoted with respect to one of said sliding members and slidably mounted for adjustment with respect to the other of said sliding members, and graduations on said abutment member and said last mentioned sliding member to indicate the angular displacement of said abutment member.

5. In a back gauge for metal shears, a pair of housing members, threaded shafts in said housing members, means for rotating said shafts in unison, members slidable with respect to said housing members and a plurality of nut members on each of said shafts, an abutment member movable with the movable ram of said shears, said abutment member pivoted with respect to one of said sliding members and slidably mounted for adjustment with respect to the other of said sliding members, each plurality of nut members being slidably mounted on a respective one of said housings, and compression springs located between adjacent nut members of respective shafts, to take up lost motion and insure accuracy of adjustment of said abutment member.

6. In a back gauge for metal shears, an abutment member movable with the movable ram, means for moving said abutment member, a common shaft operatively connected with said last-mentioned means, means for rotating said common shaft, and indicating means comprising a dial non-rotatably mounted on said common shaft, a dial rotatably mounted with respect to said common shaft, a geared connection between said two dials, and indicating means on said dials for indicating the position of said shaft.

7. In a back gauge mechanism for metal shears, a pair of threaded shafts provided with nuts, means for preventing rotation of said nuts, an abutment member mounted with respect to said nuts, common means for rotating said several shafts, indicating means for indicating the position of said shafts, said indicating means being visible from the front of said shear, and means accessible from the front of said shear for causing said shafts to rotate, said mechanism being movable with the movable ram of said shears.

8. In a back gauge for metal shears, a pair of housing members, threaded shafts in said housing members, means for rotating said shafts in unison, members slidable with respect to said housing members and controlled by nut means on said shafts, an abutment member movable with the movable ram of said shears, said abutment member pivoted with respect to said sliding members, said nut means comprising a plurality of nuts mounted on each of said shafts, and a compression spring located between adjacent nuts to take up lost motion.

9. In a back gauge for metal shears, an abutment member, means for moving said abutment member, indicating means for indicating the position of said abutment member, said means being visible from the front of said shear, and means accessible from the front of said shear for actuating said means for moving said abutment, all of said mechanism being movable with the movable ram of said shears.

10. In a back gauge for metal shears, an abutment member, means for moving said abutment member, and means accessible from the front of said shear for actuating said means for moving said abutment, all of said mechanism being movable with the movable ram of said shears.

11. In a back gauge for metal shears, an abutment member movable with the movable ram, means for moving said abutment member, said means comprising a rotatable shaft, and indicating means attached to said shaft for indicating the position of said abutment member, said indicating means comprising at least two unequally moving indicating members, one calibrated in length units and the other calibrated in fractional parts of length units.

12. In a back gauge for metal shears, a pair of threaded shafts, nuts mounted on said threaded shafts, means for preventing the rotation of said nuts, an abutment member attached to said nuts, common means comprising a shaft for rotating said threaded shafts, means located upon and accessible from the front of said shear for producing a rotation of said shaft and for indicating the position thereof, and a mechanical connection between said last-mentioned means and said means for rotating said shafts, all of said mechanism being movable with the movable ram of said shears.

13. In a back gauge for shears, abutment means movable with the movable ram, means comprising threaded shafts for moving said abutment means, a common shaft, driving connections between said first-mentioned shafts and said common shaft, a second shaft having an end located in a position of access from the front of said shear, means for rotating said last-mentioned shaft, means for indicating the position thereof, and a mechanical connection between said last-mentioned shaft and said common shaft, said mechanical connection arranged to permit transverse movement of said shafts without producing relative rotational movement.

14. In a back gauge for metal shears, a pair of threaded shafts, abutment means arranged to be moved thereby and reciprocable with the movable ram of said shears, a common shaft, driving connections between said common shaft and said threaded shafts, means accessible from the front of said shear for rotating said common shaft, dial means arranged for a fixed rotation with reference to said common shaft, a second dial means, and means producing differential rotation of said several dial means.

15. In a back gauge for metal shears, a pair of threaded shafts, abutment means arranged to be moved thereby and movable with the movable ram of said shears, a common shaft, driving connections between said common shaft and said threaded shafts, means accessible from the front of said shear for rotating said common shaft, dial means arranged for a fixed rotation with reference to said common shaft, a second dial means, and means producing differential rotation of said several dial means, a motor for producing rotation of said common shaft, an automatically acting brake on said motor, and controlling means for said motor located for access from the front of said shear, said several dials arranged in a position of visibility in the front of said shear.

16. In a back gauge for a shear, abutment means movable with the movable ram of said shear, a pair of threaded shafts controlling the movement of said abutment means, a common shaft operatively connected to said threaded shafts and extending beyond the housing of said shear, an operating shaft mounted on the housing of said shear and having an end accessible for rotation from the front of said shear, means for rotating said last-mentioned shaft, an indicating means for indicating the position thereof located for visibility from the front of said shear, and a mechanical connection between said operating shaft and said common shaft, said connection comprising a splined shaft and appropriate gearing, one portion of said gearing being slidable on said splined shaft to allow for movement of the ram of said shear, said splined shaft and said ram lying in parallel planes.

17. In a shear having a table extending forwardly of the shear knives, a back gauge comprising an abutment member, means for supporting said abutment member, means for moving said abutment member, and means accessible from the front of the shear for actuating said means for moving said abutment, all of said mechanism with the exception of said abutment member being located above the plane of said table, so as to provide clearance for sheared pieces behind and below the cutting blade of said shears.

18. In a shear having a table extending forwardly of the shear knives, a back gauge comprising an abutment member, means for supporting said abutment member, indicating means for indicating the position of said abutment member, said means being visible from the front of said shear, and means accessible from the front of said shear for actuating said means for moving said abutment, all of said mechanism with the exception of said abutment member being located above the plane of said table, so as to provide clearance for sheared pieces behind and below the cutting blade of said shears.

19. In a shear having a table extending forwardly of the shear knives, a back gauge construction comprising a pair of threaded shafts, means for rotating said shafts, an abutment member, nuts on said shafts, said abutment member being pivoted with relation to the nut on one of said shafts and slidably mounted with respect to the nut on the other of said shafts, all of said back gauge mechanism, with the exception of said abutment member, being located above the plane of said table.

20. In a back gauge for metal shears, an abutment member, means for moving said abutment member, said means comprising a motor, and a control for said motor accessible from the front of said shear, all of said mechanism being movable with the movable ram of said shears.

21. In a back gauge for metal shears, an abutment member, means for moving said abutment member, and means accessible from the front of said shear for actuating said means for moving said abutment, said abutment and means for moving it being themselves movable, and means for moving them during a shearing stroke to provide clearance.

22. In a back gauge for metal shears, an abutment member, motion transmitting means for moving said abutment member, indicating means for indicating the position of said abutment member, said means being visible from the front of said shear, and means for actuating said motion transmitting means for moving said abutment, said means comprising a motor, and control means therefor accessible from the front of said shear, said abutment means and at least a portion of said motion transmitting means being movable upon movement of the ram of said shear.

23. In a back gauge for metal shears, an abutment member movable with the movable ram, interspaced means for moving said abutment member, a common shaft operatively connected with said last mentioned means, means in a position of accessibility for rotating said common shaft, indicating means connected with said common shaft and visible from the same position of accessibility, said indicating means having a movable portion reading in length units for the full travel of said abutment means, at least one portion movable relatively to the first portion, and reading in fractions of length units.

24. In a back gauge for metal shears, an abutment member, motion transmitting means for moving said abutment member, indicating means for indicating the position of said abutment member, said means being visible from a position of accessibility, and means for actuating said motion transmitting means for moving said abutment, said means comprising a motor, control means therefor accessible from the said position of accessibility, said abutment means and at least a portion of said motion transmitting means being movable upon movement of the ram of said shear.

ROBERT T. HAZELTON.